Figure 1:
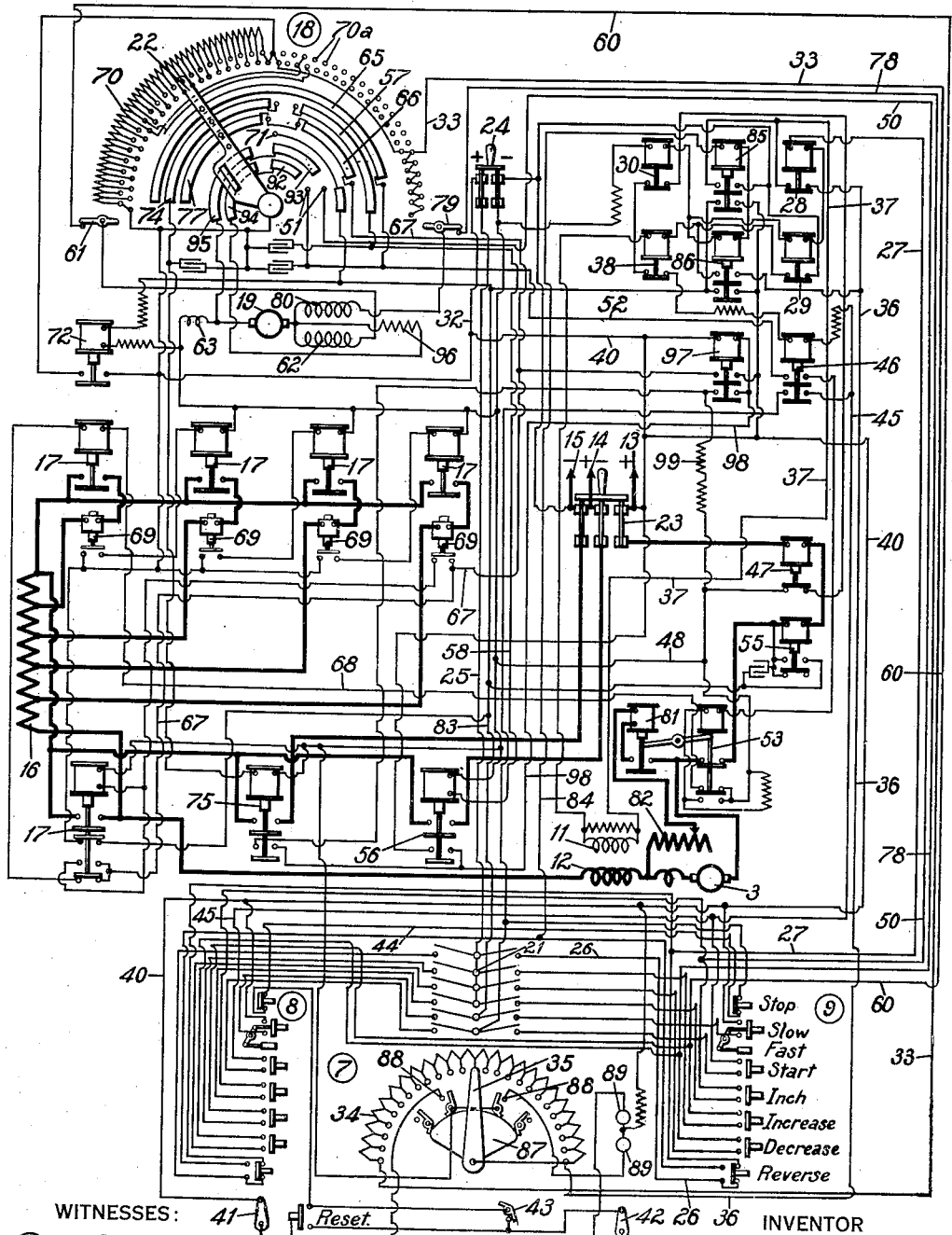

R. T. KINTZING.
MOTOR CONTROL SYSTEM.
APPLICATION FILED NOV. 18, 1916.

1,341,650.

Patented June 1, 1920.
3 SHEETS—SHEET 1.

WITNESSES:

INVENTOR
Reese T. Kintzing.
BY
ATTORNEY

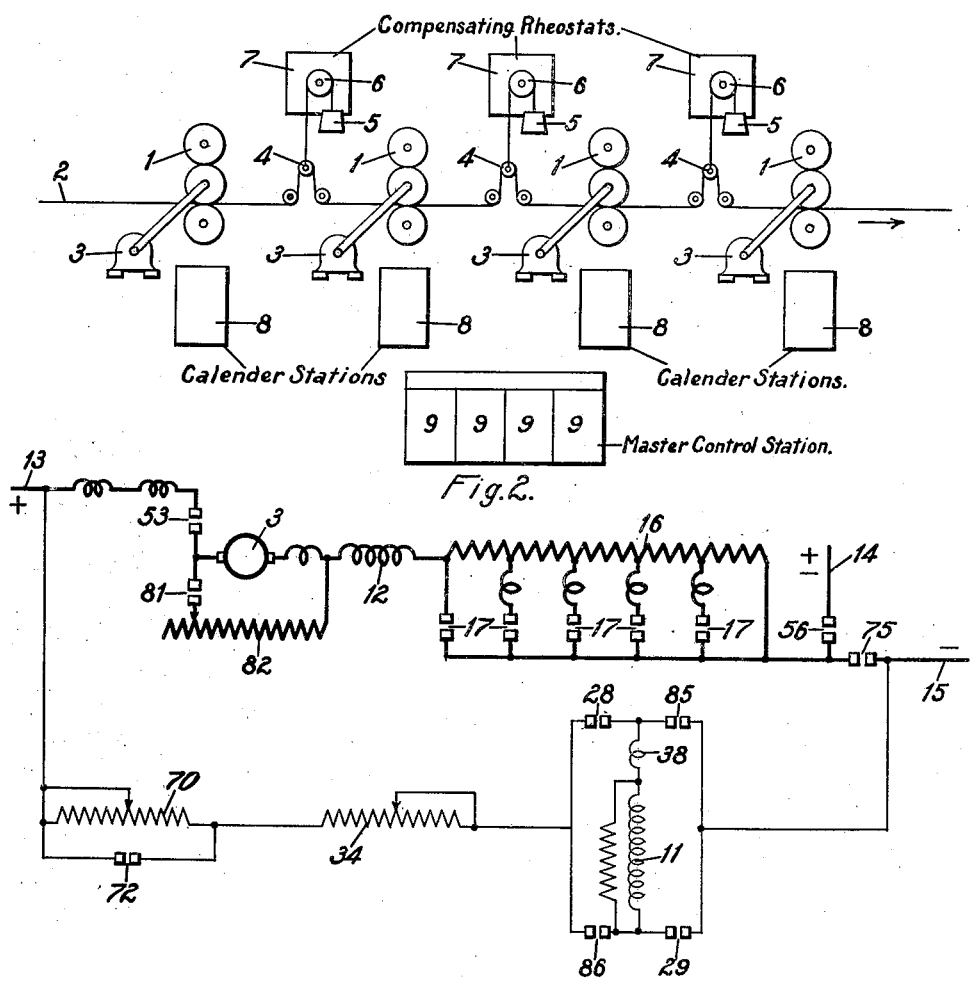

UNITED STATES PATENT OFFICE.

REESE T. KINTZING, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,341,650.   Specification of Letters Patent.   Patented June 1, 1920.

Application filed November 18, 1916. Serial No. 132,090.

*To all whom it may concern:*

Be it known that I, REESE T. KINTZING, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to protective devices for insuring the safe operation of the motor under all conditions.

My invention has for one of its objects to provide an arrangement for preventing the completion of the operating circuits of an electric motor except under predetermined conditions.

A second object of my invention is to provide means for preventing an excessive rush of current through the armature of an electric motor when the applied voltage is materially increased.

In the operation of electric motors, it is essential that means be provided for preventing the completion of the armature circuits of the motors except when the field-magnet windings of the motors are energized. In case switches are employed for reversing the connections of the field-magnet windings of the motors, it is desirable also that means be provided for preventing the energizing of the control circuits for the motors except when the reversing switches have operated to complete the circuits of the field-magnet windings.

In the present arrangement, I provide an electric motor having a shunt field-magnet winding, the connections of which may be reversed by a plurality of electromagnetic switches. A no-voltage relay, which controls the control circuits of the motor, has an actuating coil that is in series with two relays. One of the latter relays has an actuating coil that is in series with the actuating coils of the several electromagnetic reversing switches. The other relay has an actuating coil that is in series with the shunt field-magnet winding of the motor. The above arrangement insures that the no-voltage relay prevents the completion of the control circuit of the motor except when the reversing switches have operated to complete the circuit of the field-magnet winding and except when the latter is energized.

The system of control illustrating my invention also comprises a three-wire source of current to which the motor may be connected for different voltages. A starting resistor, which is gradually shunted after the motor has been connected to a low-voltage pair of conductors, is inserted in series with the motor armature during the change in connections from the low-voltage pair of conductors to the high-voltage pair. The resistor is again gradually shunted to accelerate the motor. It is not necessary that the resistor be inserted when the connections are changed to decrease the voltage and a relay, that is controlled by certain of the line switches, insures that the resistor shall be shunted during the latter operation.

It is desirable that, during the change in connections to vary the voltage applied to the motor, the field strength of the latter shall be at a maximum in order to prevent an excessive rush of current. A field resistor, which is included in circuit with the shunt field-magnet winding while the motor is connected to the low-voltage pair of conductors, is shunted during the change in connections. A relay, controlled by the controller arm, completes a shunt circuit for the resistor in order that arcs resulting from the change in connections may occur at the relay. The shunt circuit is then broken at the relay, and the resistor is gradually inserted into circuit by the movable arm of the controller.

Inasmuch as the motor circuit is opened during the brief period required for the change in connections to vary the voltage, it is essential that such change shall occur as quickly as possible. In order to accomplish this result, the controller is actuated by a pilot motor, the normal speed of which exceeds that required for the operation of the controller. The armature of the pilot motor is shunted during its actuation of the controller arm except during the transfer in voltage connections, whereupon it operates at substantially double its usual speed.

My invention is illustrated in connection with a system adapted to be employed in connection with machines for treating fabric or sheet material of any kind. The relations of the system of control to the series of rolls constituting the machine for treating fabrics constitute the subject matter of an application Serial No. 125,637, filed October 14, 1916, by Fletcher D. Hallock, and assigned to the Westinghouse Electric & Manufacturing Company.

Figure 4:
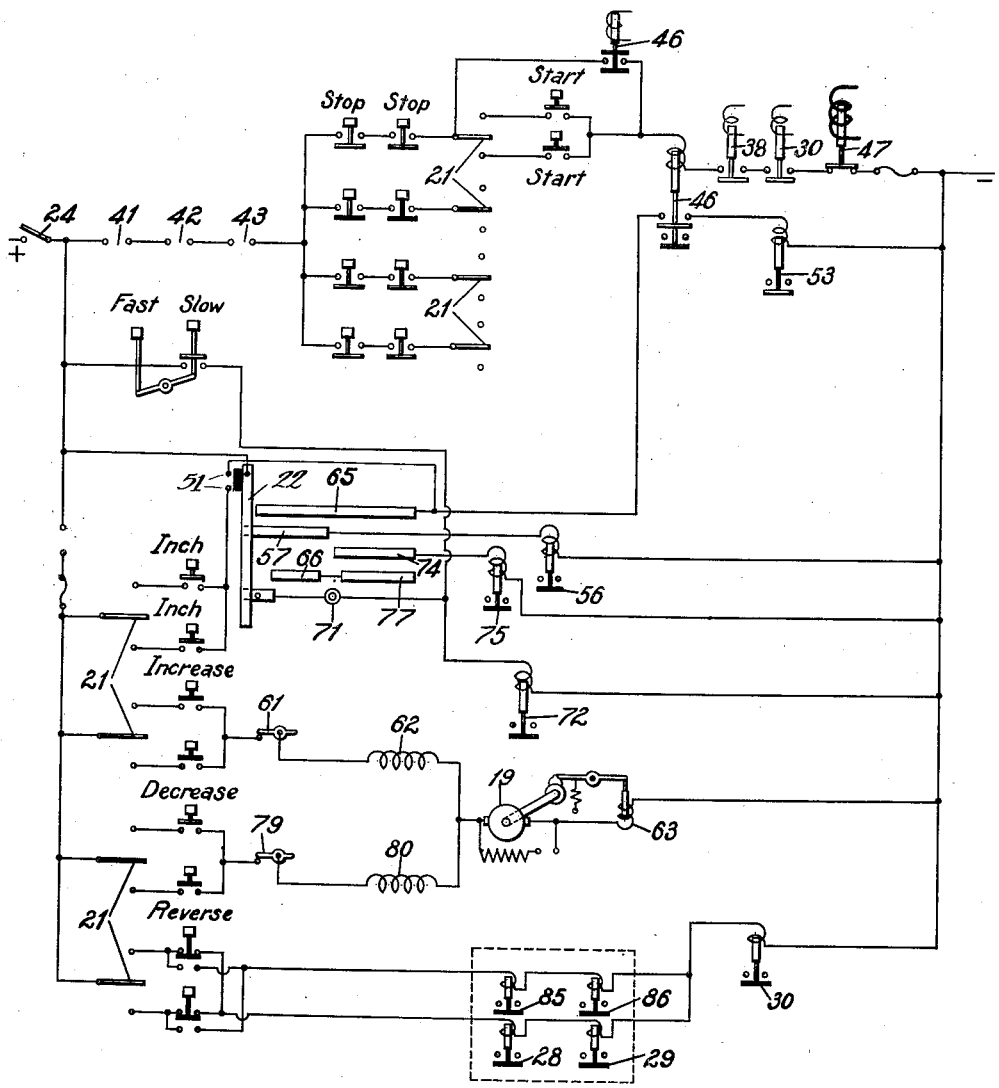

In the accompanying drawings, Figure 1 is a diagrammatic view of circuits and apparatus embodying my invention. Fig. 2 is a diagrammatic representation of a series of rolls having driving motors that are controlled in accordance with my invention. Fig. 3 is a diagrammatic view of a schematic arrangement of the main circuit for the motor of Fig. 1. Fig. 4 is a diagrammatic view of a schematic arrangement of the control circuits for the motor of Fig. 1.

Referring particularly to Fig. 2, several sets of rolls 1 are arranged in series to treat fabric or other sheet material, indicated at 2, that passes through the rolls. Each of the sets of rolls is driven by an electric motor 3 which is mechanically connected to the rolls in any suitable manner. A movably mounted idler roll 4 is placed between each pair of main rolls or calenders for the purpose of maintaining a substantially uniform tension upon the fabric.

The tensions exerted by the idler rolls are determined by the weights of the idler rolls or by weights 5 that are connected to the idler rolls by chains or ropes passing over pulleys 6. Each of the pulleys 6 is operatively connected to a rheostat 7 which may be termed a compensating rheostat by reason of the fact that it adjusts the speed of one of the driving motors 3 in order to compensate for the difference between the speeds of motors for driving adjacent sets of rolls.

Each of the motors 3 is adapted to be controlled, also, by manually operable means, preferably having the form of push-button switches, one set or station 8 of which is located adjacent to the motor or the roll driven by it. The push-button station referred to above may be termed, for convenience, a calender station. A similar push-button station 9 for controlling each of the motors is located at a central point which may be termed a master control station. By means of the arrangement above described, each of the motors may be controlled from the calender station or it may be governed in the same manner from the master control station. A single operator is thus enabled to adjust the speeds of the motors in accordance with operating conditions.

Reference may now be had to Fig. 1, in which the circuits for controlling one of the driving motors is diagrammatically illustrated. The motor, the armature of which is indicated at 3, has a shunt field-magnet winding 11 and a series field-magnet winding 12. The motor is supplied with energy from line conductors 13, 14 and 15 of a three-wire system. A sectional starting resistor 16 is controlled by a series of progressively actuated electro-magnetic switches 17. The motor circuits are controlled by a master switch 18 that is controlled by a pilot motor 19. The speed of the motor 3, which is controlled in accordance with the position of the movable arm of the master switch 18, is adjusted by means of push-button switches, one station 8 of which corresponds to the calender station described in connection with Fig. 2. A similar station 9 for producing like effects upon the speed of the main motor is adapted to be connected in circuit in accordance with the position of a double-throw switch 21. The effects produced upon the operation of the main motor by the corresponding push-button switches of the respective stations are indicated by appropriate legends.

By means of the switch 21, which may be termed a transfer switch, either the calender station 8 or the master-control station 9 may be rendered ineffective to control the motor. If all of the several transfer switches 21 are actuated to corresponding positions, the motors may be controlled only from the master-control stations or from the calender stations, according to the positions of the switches. A compensating rheostat 7 is arranged to automatically control the excitation of the shunt field-magnet winding 11 of the motor 3 within predetermined limits.

It may be assumed that the movable arm 22 of the master switch 18 occupies its inoperative position which is at the end of its path of movement in a clockwise direction. It may be assumed, further, that a manually operable line switch 23 and a control switch 24 have been closed. It may be assumed, for example, that the transfer switch 21 has been operated to connect the master-control station 9 in circuit and that the calender station 8 is inoperative.

A circuit is completed by the closing of the above switches which extends from the positive side of control switch 24 through conductor 25, switch 21, conductor 26, "reverse" button, conductor 27, actuating coil of field-reversing switches 28 and 29 and actuating coil of field-protective relay 30, to the negative side of switch 24.

The switches 28 and 29 are closed to complete the shunt-field circuit of the motor which extends from the positive side of control switch 24 through conductor 32, movable arm 22, conductor 33, resistor 34 and movable arm 35 of compensating rheostat 7, conductor 36, relay 28, conductor 37, shunt field-magnet winding 11, actuating coil of field-protective relay 38 and relay 29, to the negative side of switch 24. The shunt field-magnet winding 11 of the motor is energized by the circuit above described for operation of the motor in the forward direction.

The push-button switch designated "start" is then closed to complete a circuit which extends from the positive side of control switch 24 through conductor 40, emergency switch 41 of calender station 8, emergency switch 42 of master-control station 9, limit switch 43, "stop" push-button switch of station 8, conductor 44, "stop" push-button of station 9, switch 21, "start" push-button switch of station 9, conductor 45, actuating coil of no-voltage relay 46, relays 38 and 30, overload relay 47 and conductor 48, to the negative side of switch 24.

When the no-voltage relay 46 is closed, the motor 3 may be operated for short periods during the process of making up or threading the fabric through the rolls. An interlock connected to the no-voltage relay 46 completes a holding circuit for its actuating coil in shunt relation to the push-button switch designated "start." The push-button switch designated "inch" completes a circuit which extends from the positive side of control switch 24, through conductor 25, switch 21, "inch" button, conductor 50, contact members 51, which are bridged by the switch arm 22 in its normal "off" position, conductor 52, no-voltage relay 46, actuating coil of line switch 53 and conductor 48, to the negative side of switch 24.

The closing of line switch 53 completes the armature circuit of the motor 3 which extends from line conductor 13 through switch 23, actuating coil of overload relay 47, actuating coil of field-accelerating relay 55, line switch 53, armature 3, series field-magnet winding 12, starting resistor 16 and line switch 56, to line conductor 14. Line switch 56 is normally closed, when the switch arm 22 occupies its "off" position, by means of a circuit extending from the arm 22, which is connected to the positive side of switch 24, through contact segment 57, conductor 58 and actuating coil of switch 56, to the negative side of switch 24.

It will be noted that the motor circuit cannot be completed until after the shunt field-magnet winding 11 has been energized. Stated in another way, the energization of the control circuit of the motor is controlled by the energization of the shunt field-magnet winding.

The armature circuit of the motor is closed only while the "inch" button is held in its closed position. The motor operates slowly by reason of the fact that the entire starting resistor 16 is in circuit and the shunt field-magnet winding is fully energized.

When the fabric has been started through the rolls and the system is ready for normal operation, the push-button switch designated "increase" is actuated to complete a circuit which extends from the positive side of switch 21 through "increase" button, conductor 60, limit switch 61, field-magnet winding 62 and armature of pilot motor 19 and brake coil 63, to the negative side of switch 24. The pilot motor then actuates the switch arm 22 in a counterclockwise direction to effect the completion of the armature circuit of the driving motor 3.

When the switch arm 22 engages a contact segment 65, a circuit is completed which extends from the switch arm 22, which is connected to the positive side of the control circuit, through contact segment 65, conductor 52, no-voltage relay 46, actuating coil of line switch 53 and conductor 48, to the negative side of switch 24. The armature circuit of the motor is then completed, as traced above in connection with the operation of the "inch" button. A circuit is next completed which extends from the switch arm 22 through contact segment 66, conductor 67, interlock of accelerating switch 17 located below the resistor 16, actuating coil of accelerating switch 17 located immediately above the resistor 16, conductor 68 and interlock of line switch 53, to the negative side of switch 24.

The closing of the accelerating switch 17, the circuit for the actuating coil of which is traced above, completes a shunt circuit for one section of the resistor 16. The closing of the accelerating switch also permits the closing of a relay that is mechanically connected thereto when the current traversing a series actuating coil 69 falls to a predetermined value. The closing of each of the relays 69 completes a circuit for the actuating coil of the succeeding accelerating switch to close, and the several switches close automatically in order to completely shunt the resistor 16 when the current traversing the several relay coils 69 falls successively to predetermined values.

When the last accelerating switch 17 closes, the circuits of the actuating coils of the other accelerating switches are opened and the corresponding switches drop to their open positions. When the arm 22 moves to such position that it no longer engages the contact segment 66, the circuit of the actuating coil of the accelerating switch located below the resistor 16 is opened, and the entire resistor 16 is inserted in circuit with the motor armature in preparation for the transfer of the motor connections to a circuit of higher voltage.

During the movement of the arm 22 from its initial position, it operates to gradually insert a resistor 70 in series with the shunt field-magnet winding 11. The several contact members 70$^a$ are connected to corresponding points of the resistor 70. Only two of such connections are shown, the remainder being omitted for the sake of clearness.

When the movable arm 22 of the master switch 18 has rotated through an angle of slightly less than 90°, the circuit of the actuating coil of line switch 56 is broken at contact segment 57, and the switch 56 opens to momentarily interrupt the armature circuit. When the arm 22 is in an approximately upright position, it engages a contact member 71 to complete a circuit through the actuating coil of a relay 72 which closes a shunt circuit for the resistor 70. The arcs caused by the changes in connections of the circuit of the field-magnet winding 11 occur at the relay 72 instead of between the arm 22 and its coacting contact members.

When the arm 22 engages a contact segment 74, a circuit is completed which extends from the arm 22 through contact segment 74 and actuating coil of line switch 75, to the negative side of switch 24. The switch 75 then closes to connect the armature circuit of the motor to line conductor 15. The motor is now connected across line conductors 13 and 15, and the applied electromotive force is accordingly doubled.

When the arm 22 engages a contact segment 77, the circuit of the actuating coil of the first switch 17 to close is again completed in the same manner as that described in connection with the engagement of contact segment 66. The several accelerating switches operate automatically and in order to again shunt the resistor 16. The circuit of the actuating coil of relay 72 is broken at contact member 71, and the relay opens to permit the weakening of the field by the gradual inserting of field resistor 70 by the arm 22.

During the acceleration of the motor by weakening its field, the relay 55, which is of the well-known fluttering type, controls the circuit of the actuating coil of relay 72 and causes the latter to shunt the resistor 70 when the current traversing the actuating coil of relay 55 exceeds a predetermined value. The operation of the relays 55 and 72 thus prevents the acceleration of the motor at an abnormal rate. The motor then operates at its normal speed.

During the normal operation of the pilot motor 19, the controller arm 22 engages contact segments 92 and 93 or contact segments 94 and 95, as the case may be, to complete a shunt circuit for the armature of the pilot motor which comprises a resistor 96. Under such conditions, the pilot motor operates at a less speed than that for which it is designed. During the change in connections from the low-voltage pair of conductors to the high-voltage pair, the shunt circuit is broken and the pilot motor operates at a materially increased speed to effect the change in connections. The shunt circuit is again completed when contact segments 94 and 95 are bridged by the controller arm.

When it is desired to decrease the speed of the motor for any reason, the push button designated "decrease" is closed to complete a circuit for the pilot motor, which extends from the positive side of switch 21 through "decrease" button, conductor 78, limit switch 79, field-magnet winding 80 and armature of pilot motor 19 and brake coil 63, to the negative side of switch 24. The pilot motor 19 then actuates the arm 22 in a clockwise direction to gradually shunt the resistor 70 in series with the shunt field-magnet winding 11 to decrease the speed of the motor 3.

If the arm 22 continues its movement in a clockwise direction beyond the point at which connections are made for effecting the transfer of the motor circuit from one voltage connection to the other, the resistor 16 will not be inserted in circuit with the motor since its use is not necessary when the applied voltage is decreased. When line switch 75 closes to complete the connections to the high-voltage pair of conductors, an interlock connected to the switch completes a circuit which extends from the positive side of switch 24 through a portion of conductor 40, actuating coil of relay 97, conductor 98, interlock of switch 75, resistor 99 and conductor 48, to the negative side of switch 24.

The relay 97 then closes to complete a circuit which extends from the positive side of switch 24 through portions of conductors 32 and 40, relay 97, conductor 67, interlock of accelerating switch 17 immediately below resistor 16, actuating coil of accelerating switch 17 immediately above resistor 16, conductor 68 and interlock of line switch 53, to the negative side of switch 24. The accelerating switches are accordingly prevented from opening during the interval in which the controller arm 22, which is connected to the positive side of switch 24, is out of engagement with the contact segments 77 and 66. The closing of line switch 56 causes the interlock connected thereto to shunt the actuating coil of relay 97 and the latter opens.

The motor may be brought to rest by the opening of either of the "stop" buttons of stations 8 and 9 or either of the emergency switches 41 and 42, all of these switches being connected in series-circuit relation. As will be later described, the "stop" buttons and the emergency switches of the several control stations are all connected in series, and the opening of any of these switches operates to stop all of the motors simultaneously.

Since the "stop" switches and the emergency switches are in series with the push-button switches designated "start", the opening of a "stop" switch opens the circuit of the actuating coil of no-voltage relay 46. As above described, the relay 46 controls the circuit of the actuating coil of line switch 53, and the latter is accordingly opened. A local dynamic braking circuit for the motor armature is established by a switch 81 that is mechanically connected to the switch 53. The dynamic braking circuit comprises the motor armature, a holding coil for the switch 81 and a resistor 82.

If it should be desired to momentarily decrease the speed of the motor, the push-button switch designated "slow" is actuated to complete a circuit for the relay 72 which extends from the positive side of switch 24 through conductor 40, "slow" button, switch 21, conductor 83 and actuating coil of relay 72, to the negative side of switch 24. The relay 72 completes a shunt circuit for the resistor 70 and the motor operates at slow speed. The actuation of the push-button designated "fast" establishes normal operating conditions of the motor.

When it is desired to reverse the direction of the driving motor, the "reverse" button is actuated to open the circuit of field-reversing relays 28 and 29 and to complete a circuit which extends from the positive side of switch 21, through "reverse" button, conductor 84, actuating coils of field-reversing relays 85 and 86 and actuating coil of field-protective relay 30, to the negative side of switch 24. This effects the closing of the reversing switches 85 and 86. To operate the motor in the reverse direction, the "start" button must be pressed and the "reverse" button maintained closed in opposition to the force of a spring (not shown) normally tending to open it.

Reverse operation of the driving motor will occur only in case of abnormal conditions with respect to the rolls and the fabric and will usually be necessary for a comparatively short period. In view of these conditions, the relays 85 and 86 are provided with interlocks for completing the circuit of the actuating coil of relay 72 while they are in their closed positions. This arrangement insures that the motor operates at slow speed when it rotates in the reverse direction.

A schematic arrangement of the control circuits is diagrammatically illustrated in Fig. 4. It will be noted that the "stop" push-button switches of the several stations are arranged in parallel relation to each other and in series relation to the emergency switches that may be located either at the control stations or upon the frames of the rolls, as desired. For convenience, only one of each of the switches 41, 42 and 43 is illustrated. The several control stations are otherwise entirely independent of each other.

It will be noted that, by means of the above-described arrangement, I am enabled to avoid the possibility of damage to the motor by reason of the completion of its armature circuit when the field magnet windings are deënergized. I provide means, also, whereby a single controlling device operates automatically and successively to control the resistors in series with the armature winding and the shunt field-magnet windings, respectively, of the motor during the operation of starting the motor from rest and of transferring its connections from a low-voltage source to a high voltage source and vice versa.

I claim as my invention:

1. In a motor-control system, the combination with an electric motor having a shunt field-magnet winding and a control circuit for said motor, of a pair of switches for respectively controlling said winding and said circuit, each having an actuating coil, and a switch in circuit with one of said coils having an actuating coil in circuit with said other coil.

2. In a motor-control system, the combination with an electric motor having a shunt field-magnet winding, of a control circuit for said motor and a no-voltage relay for controlling the energization of said circuit having an actuating coil that is energized only after the energization of said field-magnet winding.

3. The combination with an electric motor having two circuits and means for closing one of said circuits, of a pair of means for respectively preventing the closing of said other circuits when said closing means is ineffective and when said one circuit is open.

4. In a motor-control system, the combination with an electric motor having a shunt field-magnet winding, and a relay having an actuating coil in series therewith, of a control circuit for said motor and a no-voltage relay for controlling said circuit having an actuating coil in circuit with said first relay.

5. In a motor-control system, the combination with an electric motor having a shunt field-magnet winding and a plurality of switches for reversing its connections, said switches having actuating coils, of a control circuit for said motor, a relay having an actuating coil in series with said first-named actuating coils, and a no-voltage relay for controlling the energization of said circuit having an actuating coil in series-circuit relation with said first named relay.

6. The combination with an electric motor having armature and field-magnet windings and control circuits for each of said windings, of means dependent upon the energization of the control circuit for said field-magnet winding for energizing the control circuit for said armature winding.

7. In a motor-control system, the combination with an electric motor having a shunt field-magnet winding and a plurality of electromagnetic switches for reversing its connections, of a control circuit for said motor and means for energizing said circuit comprising a no-voltage relay having an actuating coil, the energization of which is dependent upon the energization of the actuating coils of said switches.

8. In a motor-control system, the combination with an electric motor having a shunt field-magnet winding, and a plurality of electromagnetic switches for controlling the circuit of said winding, of a control circuit for said motor, and means dependent upon the energization of the actuating coils of said switches and the energization of said winding for controlling the energization of said circuit.

9. In a motor-control system, the combination with an electric motor having a shunt field-magnet winding, and a plurality of electromagnetic switches for controlling the circuit of said winding, of a control circuit for said motor, and means for controlling the energization of said circuit, said means comprising relays having actuating coils respectively in series with said winding and with the actuating coils of said switches.

10. In a motor-control system, the combination with an electric motor having a shunt field-magnet winding, a relay having an actuating coil in series with said winding and a plurality of electromagnetic switches for reversing the connections of said field-magnet winding, of a relay having an actuating coil in circuit with the actuating coils of said switches, and a no-voltage device having an actuating coil in series with said relays.

11. In a motor-control system, the combination with an electric motor and means for varying the voltage applied thereto, of a power-actuated device for controlling said motor and means for automatically varying the speed of said device during the variation of the applied voltage.

12. The combination with an electric motor and controlling means therefor adapted to open and close the circuit of said motor, of means for normally operating said controlling means and means for operating said controlling means at greater speed than during said normal operation when said circuit is open.

13. In a motor-control system, the combination with an electric motor, a controller therefor, a device for actuating said controller and electro-responsive means for actuating said device, of means, comprising said controller, for temporarily varying the operation of said electro-responsive means during a predetermined portion of its path of movement.

14. In a motor-control system, the combination with an electric motor, a controller therefor having a movable member, and a pilot motor for operating said controller, of means controlled by said member for controlling the circuit connections of said pilot motor to vary the speed of said pilot motor when the movable member reaches a predetermined point in its path of movement.

15. In a motor-control system, the combination with an electric motor, a controller therefor having a movable member, and a pilot motor for operating said controller, of means comprising a shunt circuit controlled by said member for varying the speed of said pilot motor when the movable member reaches a predetermined point in its path of movement.

16. In a motor-control system, the combination with means for supplying current at different voltages, an electric motor and a motor-operated controller for changing the connections of said motor, of means governed by said controller for varying the speed of the controller during a change from one voltage connection to another.

17. In a motor-control system, the combination with an electric motor, a controller therefor and a pilot motor for actuating said controller, of a normally-closed shunt circuit for the armature of said pilot motor for reducing its speed, said circuit being opened by said controller at a predetermined point in its path of movement.

18. In a motor-control system, the combination with a three-wire source of current, an electric motor, and a resistor, of means for inserting said resistor in circuit with said motor upon the successive connection of the latter to different pairs of conductors to increase the applied voltage and for preventing the inserting of said resistor when the connections are changed to decrease the applied voltage.

19. In a motor-control system, the combination with means for supplying current at different voltages, an electric motor and a starting resistor, of means comprising a controller for inserting said resistor in circuit with said motor when the connections of the latter are changed to increase the applied voltage and for preventing the inserting of said resistor when the connections are changed to decrease the applied voltage.

20. In a motor-control system, the combination with means for supplying current at different voltages, an electric motor and a starting resistor, of a controller for changing the connections of said motor for varying the applied voltage and for inserting the resistor when the voltage is increased, and means, comprising a relay, for preventing the inserting of said resistor when the voltage is decreased.

21. In a motor-control system, the combination with means for supplying current at different voltages, an electric motor and a field resistor, of an automatically operable controller for changing the connection of said motor for varying the applied voltage, and means comprising a relay having an actuating coil controlled by said controller for shunting said resistor during a transfer of connections.

22. In a motor-control system, the combination with means for supplying current at different voltages, an electric motor and a field resistor, of a controller arm for changing the connections of said motor for varying the applied voltage, a contact member carried by said arm, and a relay controlled by said contact member for shunting said resistor during a change in connections.

23. In a motor-control system, the combination with means for supplying current at different voltages, an electric motor and a field resistor, of a controller for changing the connections of said motor for varying the applied voltage, and means comprising a relay controlled by said controller for shunting said resistor during a change in connections.

24. In a motor-control system, the combination with an electric motor, of a controller for changing the connections of said motor for varying the applied voltage, a pilot motor operating said controller and means for operating said pilot motor at a speed greater than that required for the normal operation of said controller.

25. The combination with an electric motor, a source of current therefor, a plurality of conductors connected to said source and a dynamic-braking circuit for said motor, of a switch for connecting said motor to each of said conductors and a switch mechanically connected to one of said switches for closing said dynamic-braking circuit.

26. In a motor-control system, the combination with an electric motor having a field-magnet winding and a plurality of switches for reversing its connections, of a control circuit for said motor and means for preventing the energization of said circuit until after the operation of said switches.

27. In a motor-control system, the combination with an electric motor, a controller therefor having a movable member, and a pilot motor for operating said controller, of means for normally short-circuiting the armature of said pilot motor and means for reinserting said armature into circuit to increase the speed of said pilot motor.

28. In a motor-control system, the combination with an electric motor and a pair of reversing switches therefor, of a relay, a two-position switch for closing one of said reversing switches and said relay in each of its positions, and a switch for thereupon starting the motor.

29. The combination with an electric motor having a resistor associated therewith and means comprising a pair of switches for applying different voltages to said motor, of means controlled by one of said switches for preventing the insertion of said resistor when the voltage is decreased and means controlled by said other switch for rendering said preventing means ineffective.

30. In a motor-control system, the combination with an electric motor having a resistor, a switch for connecting said motor to low voltage and a second switch for connecting said motor to high voltage, of means for short-circuiting said resistor when said second switch is closed and means controlled by said first switch for preventing the insertion of said resistor when the voltage is decreased.

31. The combination with an electric motor, a controller therefor and a no-voltage relay, of means for closing said relay, means for maintaining said relay closed, and means for momentarily operating said motor when said relay is closed and said controller occupies its inoperative position.

32. The combination with an electric motor and a controller therefor having an operative position and an inoperative position, of a pair of contact members respectively adapted to be closed by said controller in each of said positions, means controlled by said contact members for controlling the circuit of said motor, a switch for rendering said controlling means operative when said controller occupies said inoperative position and means for actuating said controller to said operative position.

33. The combination with an electric motor and a controller therefor, of a pair of switches for closing the circuit of said motor and means controlled by said controller for maintaining one of said switches in operative position, and means for momentarily operating said other switch when said controller occupies its inoperative position.

In testimony whereof I have hereunto subscribed my name this 30th day of Oct. 1916.

REESE T. KINTZING.